United States Patent

[11] 3,617,485

[72] Inventor James R. Kittrell
El Cerrito, Calif.
[21] Appl. No. 801,007
[22] Filed Feb. 20, 1969
[45] Patented Nov. 2, 1971
[73] Assignee Chevron Research Company
San Francisco, Calif.

[54] HYDROCRACKING CATALYST COMPRISING AN AMORPHOUS ALUMINOSILICATE COMPONENT, A GROUP VIII COMPONENT AND RHENIUM, AND PROCESS USING SAID CATALYST
17 Claims, 2 Drawing Figs.

[52] U.S. Cl. .................................................. 208/59,
208/60, 208/61, 208/111, 252/442, 252/455
[51] Int. Cl. ............................................. C10g 13/10,
B01j 11/08
[50] Field of Search ........................................ 23/113;
208/60; 252/455, 442

[56] References Cited
UNITED STATES PATENTS
1,728,732  9/1929  Jaeger ........................ 23/113
3,132,087  5/1964  Kelley et al. ................ 208/60
3,236,762  2/1966  Rabo et al. .................. 208/111
3,140,251  7/1964  Plank et al. .................. 208/120
3,410,787  11/1968  Kubicek ...................... 208/57

OTHER REFERENCES
Klotzsche, " Freiberger, Forschungshefte," 352A, 47– 61, (1965)

*Primary Examiner*—Herbert Levine
*Attorneys*—A. L. Snow, F. E. Johnston, Charles J. Tonkin and Roy H. Davies ABSTRACT: A hydrocracking catalyst comprising an amorphous aluminosilicate cracking component having a silica-to-alumina weight ratio from 30:70 to 95:5, 0.005 to 2.0 weight percent, based on said cracking component and calculated as the metal, of a hydrogenating component selected from platinum and compounds thereof, palladium and compounds thereof, and iridium and compounds thereof, 0.005 to 2.0 weight percent, based on said cracking component and calculated as the metal, of a hydrogenating component selected from rhenium and compounds thereof, and 0.0 to 5.0 weight percent, based on said cracking component and calculated as fluorine, of fluorine or a compound thereof, and processes using said catalyst.

INVENTOR
JAMES R. KITTRELL
BY Roy H. Davis
C. J. Tonkin
ATTORNEYS

HYDROCRACKING CATALYST COMPRISING AN AMORPHOUS ALUMINOSILICATE COMPONENT, A GROUP VIII COMPONENT AND RHENIUM, AND PROCESS USING SAID CATALYST

INTRODUCTION

This invention relates to catalytic hydrocracking of hydrocarbons, including petroleum distillates and solvent-deasphalted residua, to produce high-value fuel products, including gasoline.

PRIOR ART

It is well known that a wide variety of crystalline zeolitic molecular sieves may be used as the cracking component of hydrocracking catalysts. It is also well known that the preferred, and most commonly used, hydrogenating components associated with these zeolitic cracking supports are platinum and palladium. Rabo et al. U.S. Pat. No 3,236,761, for example, provides a particular type of decationized zeolitic molecular sieve catalyst, which may be used in some reactions without added metals, and in some reactions with added metals. The various applicable reactions are isomerization, reforming, cracking, polymerization, alkylation, dealkylation, hydrogenation, dehydrogenation and hydrocracking. Rhenium is named as a metal with which the molecular sieve may be loaded, but it is not clear from the patent which reactions such a catalyst would be used to catalyze. No example of a rhenium-molecular sieve catalyst is given, and the hydrocracking portion of the disclosure indicates that the molecular sieve catalyst of the patent may be used for hydrocracking without added metals, but preferably with added platinum or palladium if a metal-loaded molecular sieve is to be used. Further, because of the great stress placed by the Rabo et al. patent on Group VIII metals in association with a molecular sieve cracking component, and particularly the noble metals, and the absence of any interest in rhenium except a passing mention, there is no guide in the patent either as to the applicability of a rhenium-molecular sieve catalyst for the hydrocracking reaction in particular, or to the amount of rhenium such a catalyst should contain, or as to the hydrocracking results that might be expected.

It is also known in the art to use 2 weight percent rhenium in association with a gel-type, that is, amorphous, silica-alumina cracking component for the hydrocracking of hydrocarbon fractions. For example, Wilson U.S. Pat. No. 3,278,418 makes such a disclosure. However, it is also known that such a catalyst has low hydrocracking activity, and that a silver promoter must be used with the rhenium to provide a catalyst having acceptable activity. Accordingly, the Wilson patent indicates that the rhenium-silica-alumina catalyst of his examples 1 and 2 has activity indices of 42 and 47, respectively, whereas with the addition of a silver promoter for the rhenium, activity indices as high as 95 could be achieved. The data in the Wilson patent indicate that with rhenium levels as high as 2 weight percent, the rhenium-silica-alumina hydrocracking catalyst had only moderate hydrocracking activity. A higher hydrocracking activity would have been obtained with a higher rhenium level, but the cost of rhenium makes higher levels undesirable. Wilson was able partially to solve the problem of maintaining low levels of rhenium and adequate hydrocracking activity by adding a second hydrogenation component—silver—to the catalyst. However, this was accomplished only at a sacrifice in catalyst stability. As correctly indicated by Wilson, a hydrocracking catalyst having a silica-alumina cracking component is extremely nitrogen sensitive, and the hydrocarbon feed hydrocracked in the presence of such a catalyst must be pretreated to reduce the nitrogen content to a low level; more than minor amounts of nitrogen in the hydrocarbon feed have an intolerable poisoning effect on the acid sites of the cracking component of the catalyst, seriously diminishing cracking activity.

It is also known that a crystalline zeolitic molecular sieve cracking component, while relatively insensitive to organic nitrogen compounds and ammonia, has a well-ordered and uniform pore structure as a result of the crystal structure having bonds that are substantially equally strong in three dimensions. This provides definite limitations on the access of reactant molecules to the interiors of the pores.

OBJECTS

In view of the foregoing, objects of the present invention include providing a novel catalyst useful for hydrocracking, and a novel hydrocracking process using said catalyst, said catalyst:

1. producing higher yields of gasoline, jet fuel or other liquid products and less butanes and dry gas than are obtainable when operating with prior art catalysts at the same conditions and product cut point;
2. having a cost no greater than present commercial hydrocracking catalysts;
3. having a mixture of hydrogenating components providing superior activity and stability, compared with a similar catalyst which contains only one of said hydrogenating components;
4. having a mixture of hydrogenating components providing superior activity and stability, compared with similar existing commercial catalysts that contain mixtures of different hydrogenating components;
5. having a hydrogenating component at least as insensitive to sulfur poisoning as prior art catalysts containing platinum-group metals;
6. Having a high hydrocracking activity with economically low levels of the hydrogenating components.

It is a further object of the present invention to provide various embodiments of a hydrocracking process using a catalyst having the aforesaid characteristics, including methods of further improving catalyst stability, and methods of operating the hydrocracking process in an integrated manner with other process units to achieve various advantageous results.

The present invention will best be understood, and further objects and advantages thereof will be apparent, from the following description when read in connection with the accompanying drawing.

DRAWING

STATEMENT OF INVENTION

Figure 1:
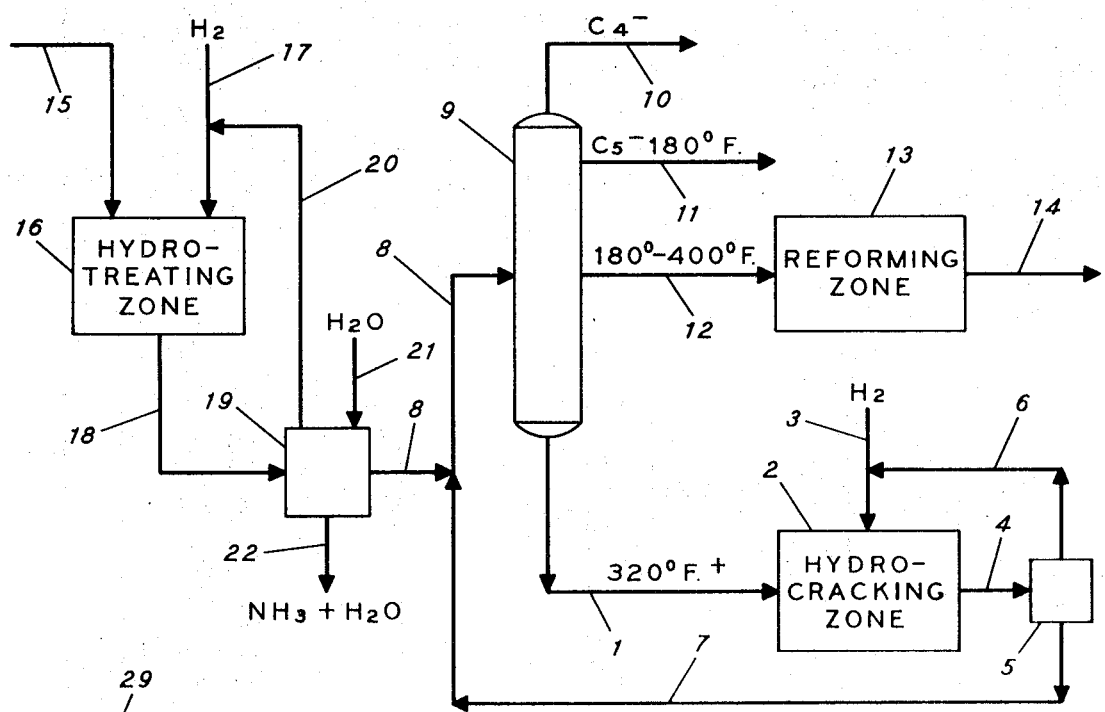
FIG. 1 is a diagrammatic illustration of apparatus and flow paths suitable for carrying out the process of several of the embodiments of the present invention, including embodiments wherein a hydrofining zone precedes the hydrocracking zone, and embodiments wherein a selected fraction from the hydrocracking zone is catalytically reformed.

It has been found that a catalyst comprising an amorphous aluminosilicate cracking component with a silica-to-alumina weight ratio from 30:70 to 95:5, a hydrogenating component selected from platinum and compounds thereof, palladium and compounds thereof, and iridium and compounds thereof, in an amount of 0.005 to 2.0 weight percent, based on said cracking component and calculated as the metal, a Group VII hydrogenating component selected from manganese and compounds thereof, technicium and compounds thereof and rhenium and compounds thereof, in an amount of 0.005 to 2.0 weight percent, calculated as metal and based on said cracking component, and a component comprising fluorine in an amount of 0.0 to 5.0 weight percent, based on said cracking component and calculated as fluorine, has all of the desirable catalyst attributes listed under OBJECTS above and, therefore, in accordance with the present invention there is provided such a catalyst and a hydrocracking process using such a catalyst. It is preferred that the catalyst contain rhenium or a compound thereof in conjunction with the Group VIII hydrogenating component. It is not obvious from Rabo et al. U.S. Pat. No 3,236,761 that a rhenium-crystalline zeolitic molecular sieve catalyst has application as a hydrocracking catalyst, or what rhenium levels such a catalyst should contain. It is even less obvious from Rabo et al. that not only should rhenium be used as a component of a hydrocracking catalyst, but that an amorphous silica-alumina component should be used instead of a molecular sieve component, and that platinum or a compound thereof, or palladium or a compound thereof, or iridum or a compound thereof, should also be incorporated in the catalyst.

Even if such matters were clear from Rabo et al. Wilson U.S. Pat. No. 3,278,418 would lead a man skilled in the art to conclude that such a catalyst would either need to contain considerably more than 2 weight percent rhenium or that it must contain a silver hydrogenating component to obtain adequate hydrocracking activity. It has been found that neither of these conclusions is correct. As will be shown hereinafter, the use of an inexpensive silica-alumina cracking component would also normally require considerably more than 1 weight percent of the noble metal component. More than 2 weight percent rhenium and more than 1 weight percent noble metal would make the hydrocracking catalyst prohibitively expensive. It is surprising that the catalyst of the present invention, containing small amounts of noble metal and rhenium in association with an amorphous silica-alumina cracking component, provides superior performance. Further, the amorphous silica-alumina cracking component is much less expensive than the crystalline zeolitic molecular sieve. Still further, Wilson would lead a man skilled in the art to conclude, even if he considered use for hydrocracking of the catalyst used in the process of the present invention, that use of a hydrogenating component in addition to rhenium, to enable the catalyst to maintain adequate hydrocracking activity at acceptably low rhenium levels, would cause the catalyst stability to suffer markedly. This conclusion also is not correct. Furthermore, Wilson provides no information which would suggest that the catalyst of the present invention would provide the marked increase in valuable liquid yield that has been found to be obtainable. Accordingly, it has been found that the catalyst of the present invention surprisingly provides advantages over the Rabo et al. platinum or palladium on molecular sieve hydrocracking catalyst and the Wilson rhenium-silica-alumina hydrocracking catalyst, while unexpectedly being free from disadvantages that the art would lead one to expect. In particular, in the catalyst of the present invention: (1) the presence of the rhenium component results in a catalyst of higher stability than a catalyst that is identical except that contains no rhenium; (2) the presence of the component selected from platinum and compounds thereof, palladium and compounds thereof, and iridium and compounds thereof results in a catalyst of higher activity and stability than a catalyst that is identical except that contains no such Group VIII components; (3) the specific combination of the rhenium component and the Group VIII component provides enhanced activity and stability while at the same time producing exceptionally high yields of liquid products; and (4) the unusually low metals level results in no significantly detrimental effects on catalyst performance.

In accordance with the present invention, therefore, there is provided a hydrocracking catalyst comprising an amorphous aluminosilicate cracking component, with a silica-to-alumina weight ratio from 30:70 to 95:5, 0.005 to 2.0 weight percent, based on said cracking component and calculated as the metal, of a hydrogenating component selected from platinum and compounds thereof, palladium and compounds thereof, and iridium and compounds thereof, 0.005 to 2.0 weight percent, based on said cracking component and calculated as the metal, of a hydrogenating component selected from rhenium and compounds thereof, and a component comprising fluorine in an amount of 0.0 to 5.0 weight percent based on said cracking component and calculated as fluorine.

Further, the catalyst of the present invention is effective for various hydrocarbon conversion reactions, including hydrocracking, hydrodesulfurization, hydrodenitrification, hydrogenation and hydroisomerization.

Said cracking component may be present in said catalyst in an amount of 10 to 99.9 weight percent, based on the total catalyst. If desired, said catalyst may further comprise a crystalline zeolitic molecular sieve cracking component in the amount of 1 to 50 weight percent, based on the total catalyst.

Said catalyst additionally may comprise additional components, for example: (a) a component selected from the group consisting of alumina and silica-alumina; (b) a hydrogenating component selected from the group consisting of Group IV metals and compounds thereof and nickel and compounds thereof; (c) titania; which advantageously may be present when the catalyst comprises alumina or silica-alumina; and (d) tin or a compound thereof, which advantageously may be present when the catalyst comprises nickel or a compound thereof. When said catalyst comprises said additional components, preferably the catalyst is prepared by coprecipitation of said additional components to form a slurry, followed by addition of the basic rhenium-noble metal-silica-alumina catalyst of the present invention (and additionally a crystalline zeolitic molecular sieve component, if desired) to the slurry in particulate form, followed by filtering, washing and drying to produce a hydrogel matrix containing said basic catalyst dispersed therethrough.

Further in accordance with the present invention, there is provided a hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst of the present invention at hydrocracking conditions including a temperature in the range 400° to 950° F., a pressure in the range 800 to 3,500 p.s.i.g., a liquid hourly space velocity in the range 0.1 to 5.0, and a total hydrogen supply rate of 200 to 20,000 s.c.f. of hydrogen per barrel of said feedstock, and recovering from said reaction zone valuable products, including gasoline. The hydrogen feedstock preferably contains less than 1,000 p.p.m. organic nitrogen. A prior hydrofining step may be used, if desired, to reduce the feed nitrogen content to the preferred level.

Further in accordance with the present invention, advantageous results are obtained by providing in the reaction zone, in addition to the catalyst of the present invention, a separate second catalyst comprising a hydrogenating component selected from Group VI metals and compounds thereof, a hydrogenating component selected from Group VIII metals and compounds thereof, and a component selected from the group consisting of alumina and silica-alumina. Further in accordance with the present invention, said separate catalyst may be located in said reaction zone in a bed disposed above the catalyst of the present invention. In the embodiments of the present invention discussed in this paragraph, no other prior hydrofining step generally will be necessary, because hydrofining is accomplished in one reaction zone concurrently with hydrocracking, together with some hydrogenation of aromatics.

Still further in accordance with the present invention, there is provided a hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof, and a component selected from the group consisting of alumina and silica-alumina, the catalyst of said second bed being the catalyst of the present invention, maintaining said first bed of catalyst and said second bed of catalyst at a temperature in the range 400° to 950° F. and a pressure in the range 800 to 3,500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

The hydrocracking zone of the process of the present invention may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone containing the catalyst of the present invention in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing the catalyst of the present invention.

NITROGEN CONTENT OF FEEDSTOCKS

While the process of the present invention can be practiced with utility when supplying to the hydrocracking zone containing the catalyst of the present invention, hydrocarbon feeds containing relatively large quantities of organic nitrogen, for example several thousand parts per million organic nitrogen, it is preferred that the organic nitrogen content be less than 1,000 parts per million organic nitrogen. A preferred range is 0.1 to 1,000 parts per million; more preferably, 0.1 to 10 parts per million. As previously discussed, a prior hydrofining step may be used, if desired, to reduce the feed nitrogen content to the preferred level. The prior hydrofining step advantageously may also accomplish hydrogenation and a reasonable amount of hydrocracking. The hydrofining step need not accomplish complete organic nitrogen content reduction. Ammonia produced in the hydrofining zone either may be removed from the system between the hydrofining zone and the hydrocracking zone containing the hydrocracking catalyst comprising said component, or may be permitted to pass into the hydrocracking zone along with the feed thereto.

SULFUR CONTENT OF FEEDSTOCK

While the process of the present invention can be practiced with utility when supplying to the hydrocracking zone, containing the catalyst of the present invention, hydrocarbon feeds containing relatively large quantities of organic sulfur, it is preferable to maintain the organic sulfur content of the feed to that zone in a range of 0 to 3 weight percent, preferably 0 to 1 weight percent.

Catalyst Comprising an Amorphous Aluminosilicate Component, a Rhenium or Rhenium Compound Hydrogenating Component, and a Hydrogenating Component Selected from Platinum and Compounds Thereof, Palladium and Compounds Thereof, and Iridium and Compounds Thereof A. General The amorphous aluminosilicate may be any catalytically active amorphous aluminosilicate with a silica-to-alumina weight ratio from 30:70 to 95:5, although the range from 70:30 to 90:10 is preferred. This component will be present in the catalyst in an amount of 10 to 99.9 weight percent, based on the total catalyst.

The rhenium hydrogenating component of the catalyst may be present in the final catalyst in the form of the metal, metal oxide, metal sulfide, or a combination thereof. The rhenium or compound thereof may be combined with the aluminosilicate cracking component, or may be combined with other catalyst components dispersed upon said cracking component, or both. In any case, the rhenium will be present in an amount of 0.005 to 2.0 weight percent, preferably 0.005 to 0.3 weight percent, based on said cracking component and calculated as the metal. Surprisingly, rhenium contents in excess of 0,3 weight percent provide only marginal catalytic improvements in gas oil hydrocracking, and serve primarily only to increase catalyst cost.

When a conventional crystalline zeolitic molecular sieve cracking component is included in the catalyst, said molecular sieve cracking component may be of any type that is known in the art as a useful component of a conventional hydrocracking catalyst comprising a noble metal or noble metal compound hydrogenating component. A decationized molecular sieve cracking component is preferred. Especially suitable are faujasite, particularly Y-type and X-type faujasite, and mordenite, in the ammonia form, hydrogen form, alkaline earth-exchanged form, or rare earth-exchanged form.

The hydrogenating component of the catalyst that is selected from platinum, palladium, iridium, and compounds of platinum, palladium and iridium may be present in the final catalyst in the form of the metal, metal oxide, metal sulfide, or a combination thereof. This component may be combined with the amorphous aluminosilicate cracking component, or may be combined with other catalyst components dispersed upon said aluminosilicate cracking component, or both. In any case, the component will be present in an amount of 0.005 to 2.0 weight percent, preferably 0.005 to 0.3 weight percent, based on said aluminosilicate cracking component and calculated as the metal. Again, it is surprising for an amorphous aluminosilicate support that palladium contents in excess of 0.3 weight percent provide only marginal improvements in gas oil hydrocracking.

B. Method of Preparation

In the case wherein rhenium or a compound thereof and platinum, palladium of iridium, or compounds of platinum, palladium or iridium are added directly to an amorphous aluminosilicate cracking component, impregnation using aqueous solutions of suitable hydrogenating metal compounds or adsorption of suitable hydrogenating metal compounds are operable methods of incorporating the hydrogenating components or compounds thereof into the amorphous aluminosilicate component. In this case, commercial aluminosilicates may be used, or a gel may be formed from silicon- and aluminum-containing compounds by methods well known in the art. Said catalytic metals may be added either to the dry gel or wet gel, with due consideration being given to the solubility of the impregnating metal compounds in water.

The rhenium compound used in the catalyst preparation generally will contain rhenium in anionic form. The compound may be one that is soluble in water, and that contains no ions that are known as contaminants in hydrocracking catalysts. Suitable rhenium compounds are perrhenic acid, $HReO_4$, and ammonium perrhenate, $NH_4ReO_4$.

The platinum, palladium or iridium compounds used in preparing the catalyst may be any convenient compound, for example platinum, palladium or iridium chloride, tetra ammino palladium nitrate, etc.

The fluorine compound used in the preparation of the catalyst may be any convenient compound, for example hydrogen fluoride, ammonium fluoride, etc.

Where the amorphous aluminosilicate component with said hydrogenating components is dispersed in a matrix of other catalyst components, the dispersion may be accomplished by cogelation of said other components around said aluminosilicate component in a conventional manner.

The catalyst of the present invention may also be prepared from direct cogelation of the hydrogenation components with the silicon and aluminum compounds. Due to the high solubility of palladium or rhenium compounds, such as tetra ammino palladium nitrate or perrhenic acid, these compounds must be made insoluble in water to prevent them from being removed from the catalyst during the filtration and washing of the gel. Such insolubility may be achieved by either reducing the metal compounds prior to washing, e.g., reduction of tetra ammino palladium nitrate by formaldehyde in alkaline solution, or by combining the metals with other elements to form insoluble compounds, such as sulfides. Alternatively, a solvent other than water and in which the metal compounds are insoluble is usable, or cogelation techniques not requiring washing may be used.

Following combination of the catalyst components by any method, the resulting composition may be washed free of impurities and dried at a temperature in the range 500° to 1,200° F., preferably 900° to 1,150° F., for a reasonable time, for example 0.5 to 48 hours, preferably 0.5 to 20 hours.

The finished catalyst may be sulfided in a conventional manner prior to use, if desired. If not presulfided, the catalyst may tend to become sulfided during process operation from any sulfur compounds that may be present in the hydrocarbon feed. The equilibrium degree of sulfiding at a given operating temperature will be different than in a corresponding catalytic system wherein a noble metal component alone is present, with no rhenium being present.

SEPARATE HYDROFINING CATALYST

A. General

As previously indicated, advantageous results are obtained by providing in the reaction zone containing the hydrocacking catalyst of the present invention a separate second catalyst comprising a hydrogenating component selected from Group VI metals and compounds thereof, a hydrogenating component selected from Group VIII metals and compounds thereof, and a support selected from the group consisting of alumina and silica-alumina. Pellets or other particles of this separate second catalyst may be physically mixed with said hydrocracking catalyst, but preferably are disposed in a separate catalyst bed located ahead of said hydrocracking catalyst in the same reactor shell, eliminating interstage condensation, pressure letdown and ammonia and hydrogen sulfide removal. In a preferred arrangement using downflow of hydrocarbon feed, the bed of separate second catalyst is located above said hydrocracking catalyst in the same reactor shell.

Where said separate second catalyst is located in the same reactor shell as the hydrocracking catalyst of the present invention, it is preferably present in an amount in the range of 10 to 40 volume percent of the total amount of catalyst in the reactor.

In an arrangement preferred to the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor in the presence of the catalyst of the present invention.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia and hydrogen sulfide.

Preferably, said separate second catalyst contains nickel or cobalt or compounds thereof in an amount of 1 to 15 weight percent, calculated as metal, and molybdenum or tungsten or compounds thereof, in an amount of 5 to 30 weight percent, calculated as metal, with the remainder of the catalyst consisting of alumina, or silica-alumina containing up to 50 weight percent silica.

Particularly preferred examples of said separate second catalyst, comprising silica-alumina, are:

| % by weight of total catalyst, calculated as metal | | | $SiO_2/Al_2O_3$ weight ratio |
|---|---|---|---|
| Ni | Mo | W | |
| 1. 4–10 | 15–25 | | 10/90 to 30/70 |
| 2. 6–15 | | 15–30 | 30/70 to 50/50 |

B. Method of Preparation

Said separate second catalyst may be prepared by any conventional preparation method, including impregnation of an alumina or silica-alumina support with salts of the desired hydrogenating component, or cogelation of all components, with the latter method being preferred.

As previously pointed out, the hydrocracking catalyst of the present invention has activity and stability advantages over a hydrocracking catalyst comprising rhenium and a gel-type silica-alumina. It has been found that use of said separate second catalyst in the above-described arrangements further increases the stability of the hydrocracking catalyst of the present invention, compared with the stability of the latter catalyst when the identical feed thereto has not been first or concurrently processed in the presence of said separate second catalyst.

OPERATING CONDITIONS

The hydrocracking zone containing the catalyst of the present invention is operated at hydrocracking conditions including a temperature in the range 400° to 950° F., preferably 500° to 850° F., a pressure in the range 800 to 3,500 p.s.i.g., preferably 1,000 to 3,000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2,000 to 20,000 s.c.f., of hydrogen per barrel of feedstock.

Where a separate hydrofining zone, which also may accomplish hydrogenation and some hydrocracking, is located ahead of the hydrocracking zone containing the catalyst of the present invention, the operating conditions in the separate hydrofining zone include a temperature of 400° to 900° F., preferably 500° to 800° F., a pressure of 800 to 3,500 p.s.i.g., preferably 1,000 to 2,500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2,000 to 20,000 s.c.f. of hydrogen per barrel of feedstock.

Where a separate bed of hydrofining catalyst is located above a bed of the hydrocracking catalyst of the present invention in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains the hydrocracking catalyst of the present invention, comprising an amorphous aluminosilicate cracking component with a silica-to-alumina weight ratio from 30:70 to 95:5, 0.005 to 2.0 weight percent, calculated as metal and based on said cracking component, of a component selected from platinum and compounds thereof, palladium and compounds thereof and iridium and compounds thereof, 0.005 to 2.0 weight percent, calculated as metal and based on said cracking component, of a component selected from rhenium and compounds thereof, and 0.0 to 5.0 weight percent, calculated as fluorine and based on said cracking component, of fluorine or a compound of fluorine. As previously discussed, said catalyst may be dispersed in a matrix of other catalyst components. Also as previously discussed, a separate second catalyst, previously described, may be located in hydrocracking zone 2. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^1$ fraction which is withdrawn through line 10, a $C_5$–180° F. fraction which is withdrawn through line 11, and a 180°–400° F. fraction which is withdrawn through line 12.

Still referring to FIG. 1, in accordance with another embodiment of the present invention, the 180°–400° F. fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22. The scrubbed feedstock is passed through line 8 to distillation column 9 and thence to hydrocracking zone 2.

Figure 2:
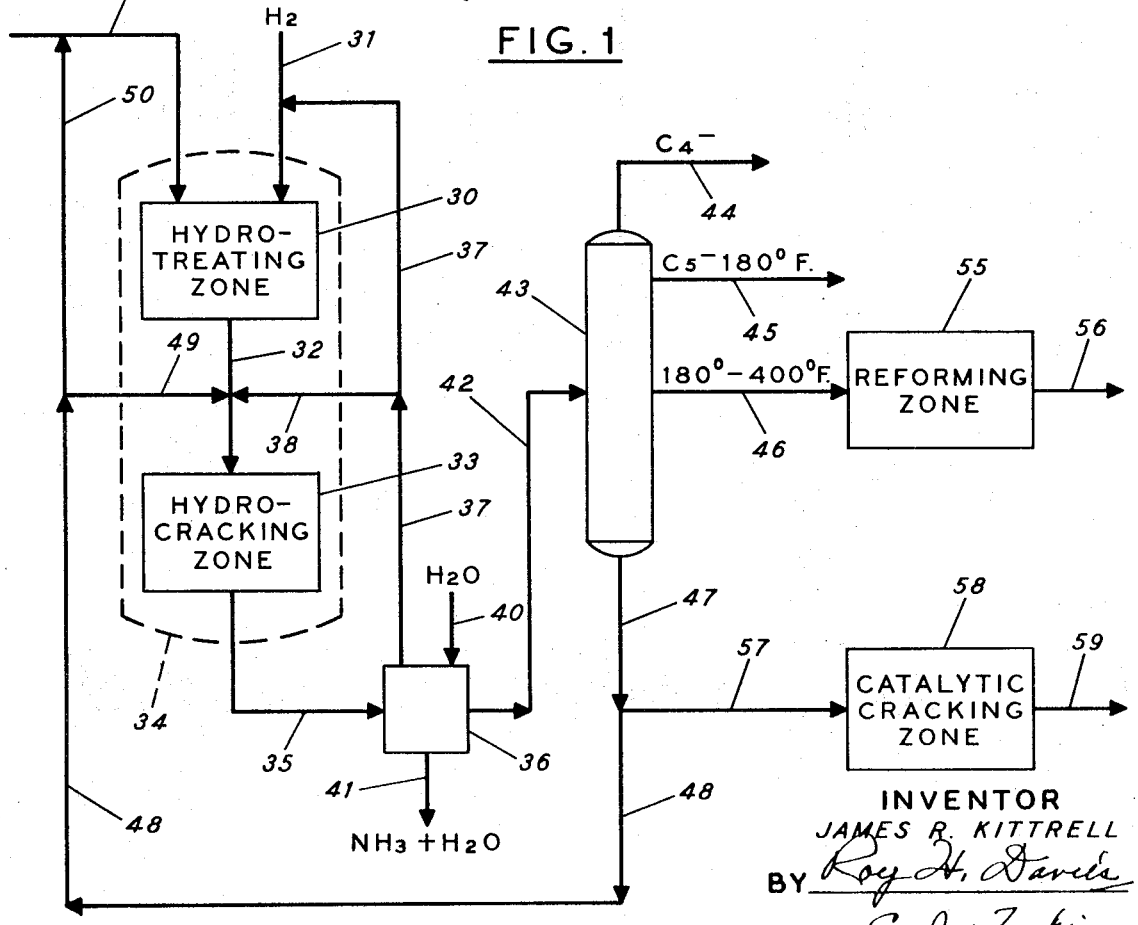
FIG. 2 is a diagrammatic illustration of apparatus and flow paths suitable for carrying out and process of additional embodiments of the present invention, including embodiments wherein a hydrofining zone precedes a hydrocracking zone in a single reactor shell, and embodiments wherein a selected fraction from the hydrocracking zone is catalytically cracked.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of a hydrocracking catalyst as described in connection with FIG. 1. Said catalyst may contain other catalytic components, and a separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4$ fraction which is withdrawn through line 44, a $C_5$–180° F. fraction which is withdrawn through line 45, a 180° F. + fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the practice of the process of the present invention. However, it is to be understood that these examples are not intended in any way to limit the scope of the present invention.

EXAMPLE 1

A commercially available, bead silica-alumina, containing approximately 90 percent silica and 10 percent alumina, was crushed 8–16 mesh and impregnated with palladium chloride. It was dried, and calcined in flowing air. The catalyst contained about 1 weight percent palladium as metal, and is labeled Catalyst A (a comparison catalyst).

The catalyst was sulfided and tested by hydrocracking a California light cycle oil having a gravity of approximately 30° API, an organic nitrogen content of about 0.5 p.p.m., and an end point of about 6002° F. The hydrocracking was accomplished, on a once-through liquid basis, at a pressure of 1,200 p.s.i., a liquid hourly space velocity of 1.5, a conversion of 60 liquid volume percent below 400° F., and a hydrogen supply rate of approximately 7,000 s.c.f./bbl.

The starting temperature of this run was 590° F. and the catalyst fouled at a rate of 0.05° F./hr. The 180°–400° F. product contained 0.3 percent aromatics and the reaction consumed 1,800 s.c.f./bbl. of hydrogen at a particular test temperature.

EXAMPLE 2

A commercially available, bead silica-alumina, containing approximately 90 percent silica and 10 percent alumina, was crushed 8–16 mesh and impregnated with perrhenic acid. It was dried, and calcined two hours at 1,350° F. in flowing air. The catalyst contained 1.1 weight percent rhenium as metal, by analysis, and is labeled Catalyst B (a comparison catalyst).

The catalyst was sulfided and tested by hydrocracking a California light cycle oil having a gravity of approximately 30° API, an organic nitrogen content of about 0.3 p.p.m., and an end point of about 700° F. The hydrocracking was accomplished, on a recycle liquid basis, at a pressure of 1,200 p.s.i.g., a liquid hourly space velocity of 1.5, a per-pass conversion of 60 liquid volume percent below 400° F., and a hydrogen supply rate of approximately 7,000 s.c.f./bbl.

The starting temperature of this run was 630° F., and the catalyst fouled at a rate of 0.16° F./hr.

EXAMPLE 3

A commercial impregnated and sulfided catalyst (Catalyst C, a comparison catalyst), consisting of nickel sulfide and the silica-alumina described in example 1, was tested for hydrocracking at the same conditions used in examples 1. The starting temperature was 570° F. and the fouling rate 0.13° F./hr. However, the 180°–400° F. product contained 30.5 percent aromatics and the reactor consumed 850 s.c.f./bbl. of hydrogen at a particular reaction temperature.

The following table summarizes the results of examples 1, 2 and 3:

TABLE I

| | Catalyst | | |
|---|---|---|---|
| | A | B | C |
| Hydrogenation component | 1% Pd | 2% Re | 7% Ni |
| Starting temperature, ° F | 590 | 630 | 570 |
| Fouling rate, ° F./hr | 0.05 | 0.16 | 0.13 |
| Hydrogen consumption, s.c.f./bbl | 1,800 | | 850 |

Considering the relative catalyst performances, reactor costs and catalyst costs, it is not surprising that the palladium- and rhenium-silica-alumina catalysts have not been commercialized for hydrocracking. Most commercial hydrocracking catalysts comprise nickel on amorphous silica-alumina or palladium on crystalline zeolitic molecular sieves.

EXAMPLE 4

A commercially available, bead silica-alumina containing approximately 90 percent silica and 10 percent alumina was crushed 8–16 mesh and impregnated with tetra ammino palladium nitrate to a level of 0.5 weight percent. The catalyst was dried and calcined at 950° F. This catalyst then further was impregnated with a solution of perrhenic acid to achieve 0.4 weight percent rhenium on the catalyst, by analysis. This composite catalyst was again dried and calcined at 1,350° F. in flowing air. The catalyst is referred to herein as catalyst D.

The catalyst was tested at the conditions of example 2 to ascertain its hydrocracking performance. Its performance is compared to that of a commercial nickel-aluminosilicate cogel catalyst (Catalyst E, E, a comparison catalyst). It should be noted that because Catalyst E is prepared by cogelation its performance is far superior to that of impregnated Catalyst C. Catalyst D also is far superior to Catalysts A, B and C, despite the fact that it is prepared by impregnation rather than cogelation.

Table II indicates that the impregnated version of the catalyst of the present invention has a low fouling rate comparable with the low fouling rate of the cogelled comparison Catalyst E. Significant further enhancements in the performance of Catalyst D are possible through cogelation techniques.

TABLE II

| | Catalyst D | Catalyst E |
|---|---|---|
| Starting Temperature, °F., | ~585 | 550 |
| Fouling Rate, °F./hr. | ~ 0.03 | 0.02 |

EXAMPLE 5

Table III, below, illustrates the primary advantage of Catalyst D, of the present invention, over the best prior art catalysts. At the comparison temperature, a 3 percent increase in gasoline product yield is achieved by Catalyst D, with a concomitant decrease in low-value gas yields. Furthermore, the low metal levels of the catalyst of the present invention result in low catalyst costs comparable to the costs of present commercial catalysts.

To illustrate that this advantage in liquid yield is possible only with the combination of catalyst components contained in the catalyst of the present invention, Catalyst F (a comparison catalyst) was prepared by impregnating Catalyst E with a solution of perrhenic acid to achieve a level of 0.6 weight percent rhenium as metal, by analysis. This catalyst was then dried and calcined at 950° F. in flowing air. The catalyst was tested under the hydrocracking conditions of example 2.

Table III illustrates the $C_5$ + liquid yield results of using Catalysts D, E and F:

TABLE III

| | $C_5$+ Liquid Yield weight percent to feed |
|---|---|
| Catalyst D | 91 |
| Catalyst E | 88 |
| Catalyst F | 88 |

CONCLUSIONS

Applicant does not intend to be bound by any theory for the unexpected superior activity and stability of the catalysts of the present invention. However, he assumes that the favorable results are largely attributable to a different, and more favorable, equilibrium at a given operating temperature for the system consisting of rhenium metal, the various rhenium oxides, the various rhenium sulfides, platinum, palladium or iridium metal, the various oxides of platinum, palladium or iridium, the various sulfides of platinum, palladium or iridium, and sulfur and hydrogen, than for the system consisting of platinum metal, platinum oxide, platinum sulfide, sulfur and hydrogen, which provides a hydrocracking catalyst superior to the Rabo et al. noble-metal-containing catalyst.

It has been shown that the process of the present invention has advantages over conventional hydrocracking processes, particularly in that the hydrocracking catalyst comprising an amorphous aluminosilicate cracking component, a rhenium or rhenium-compound hydrogenating component, and a hydrogenating component selected from platinum, palladium and iridium and compounds of platinum, palladium and iridium, has high stability and high cracking activity, and produces high liquid yields.

Although only specific embodiments of the present invention have been described, numerous variations can be made in these embodiments without departing from the spirit of the invention, and all such variations that fall within the scope of the appended claims are intended to be embraced thereby.

What is claimed is:

1. A hydrocracking catalyst comprising an amorphous aluminosilicate cracking component having a silica-to-alumina weight ratio from 30:70 to 95:5, 0.005 to 2.0 weight percent, based on said cracking component and calculated as the metal, of a hydrogenating component selected from platinum and compounds thereof, palladium and compounds thereof, and iridium and compounds thereof, 0.005 to 2.0 weight percent, based on said cracking component and calculated as the metal, of a hydrogenating component selected from rhenium and compounds of rhenium, and 0.0 to 5.0 weight percent, based on said cracking catalyst and calculated as fluorine, of fluorine or a compound thereof.

2. A catalyst as in claim 1 which is dispersed in a matrix, said matrix containing a component selected from the group consisting of alumina gel and silica-alumina gel.

3. A catalyst as in claim 2, which further comprises at least one hydrogenating component selected from Group VI metals and compounds thereof and nickel and compounds thereof.

4. A catalyst as in claim 2, wherein said catalyst of claim 1 is in particulate form.

5. A catalyst as in claim 2, which further comprises titania.

6. A catalyst as in claim 3, which further comprises tin or a compound of tin.

7. A catalyst as in claim 2, which further comprises a crystalline zeolitic molecular sieve component, in the amount of 1 to 50 weight percent, based on the total catalyst.

8. A hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, a hydrocracking conditions including a temperature in the range 400° to 950° F., a pressure in the range 800 to 3,500 p.s.i.g., a liquid hourly space velocity in the range 0.1 to 5.0 and a total hydrogen supply rate of 200 to 20,000 s.c.f. of hydrogen per barrel of said feedstock, and recovering from said reaction zone valuable products, including gasoline.

9. A process as in claim 8, wherein said catalyst is dispersed in a matrix, said matrix containing a component selected from the group consisting of alumina gel and silica-alumina gel.

10. A process as in claim 9, wherein said catalyst further comprises at least one hydrogenating component selected from the group consisting of Group VI metals and compounds thereof and nickel and compounds thereof.

11. A process as in claim 8, wherein said hydrocarbon feedstock contains 0.1 to 1,000 p.p.m. organic nitrogen.

12. A process as in claim 8, wherein said reaction zone contains, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina.

13. A process as in claim 12, wherein said separate second catalyst is located in said reaction zone in a bed disposed above said catalyst comprising the catalyst of claim 1.

14. A hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof and a component selected from the group consisting of alumina and silica-alumina, the catalyst of said second bed being the catalyst of claim 1, maintaining said first bed of catalyst and said second bed of catalyst at a temperature in the range 400° to 950° F. and a pressure in the range 800 to 3,500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

15. A process as in claim 14, wherein the effluent from said second bed of catalyst is separated into fractions, including a light gasoline fraction, a heavy gasoline fraction, and a fraction boiling generally higher than said heavy gasoline fraction.

16. A process as in claim 15, wherein said heavy gasoline fraction is catalytically reformed.

17. A process as in claim 15, wherein said fraction boiling generally higher than said heavy gasoline fraction is catalytically cracked.

* * * * *

PO-1050
(5/69)

UNITED STATES PATENT OFFICE
CERTIFICATE OF CORRECTION

Patent No. 3,617,485          Dated November 2, 1971

Inventor(s) JAMES R. KITTRELL

It is certified that error appears in the above-identified patent and that said Letters Patent are hereby corrected as shown below:

Col. 4, line 17, "Group IV" should read --Group VI--;

line 59, after "separate" and before "catalyst"

insert --second--.

Col. 10, line 36, "180°F.+ fraction" should read

--180°-400°F.+ fraction--.

Col. 11, line 1, "6002°F." should read --600°F.--.

Signed and sealed this 25th day of April 1972.

(SEAL)
Attest:

EDWARD M. FLETCHER, JR.          ROBERT GOTTSCHALK
Attesting Officer                 Commissioner of Patents